United States Patent
Koarai

(10) Patent No.: US 8,285,078 B2
(45) Date of Patent: Oct. 9, 2012

(54) IMAGE PROCESSING SYSTEM

(75) Inventor: Shohji Koarai, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1188 days.

(21) Appl. No.: 12/149,946

(22) Filed: May 9, 2008

(65) Prior Publication Data

US 2009/0175504 A1 Jul. 9, 2009

(30) Foreign Application Priority Data

May 10, 2007 (JP) ................. 2007-126079

(51) Int. Cl.
*G06K 9/32* (2006.01)
(52) U.S. Cl. ........ 382/293; 382/296; 382/298; 382/167; 382/305
(58) Field of Classification Search .......... 382/167, 382/293–299, 305
See application file for complete search history.

(56) References Cited

U.S. PATENT DOCUMENTS

| | | | | |
|---|---|---|---|---|
| 5,914,793 A | * | 6/1999 | Suzuki et al. | 358/527 |
| 2005/0071759 A1 | * | 3/2005 | Connors et al. | 715/517 |

FOREIGN PATENT DOCUMENTS

| | | |
|---|---|---|
| JP | 07-038712 | 2/1995 |
| JP | 09-093378 | 4/1997 |
| JP | 2003-270895 | 9/2003 |
| JP | 2004-240829 | 8/2004 |
| JP | 2005-268906 | 9/2005 |
| JP | 2006-094099 | 4/2006 |
| JP | 2006-245995 | 9/2006 |
| JP | 2007-164770 | 6/2007 |

* cited by examiner

*Primary Examiner* — Wesley Tucker
(74) *Attorney, Agent, or Firm* — Edwards Wildman Palmer LLP; David G. Conlin; David A. Tucker

(57) ABSTRACT

An image processing system capable of checking whether or not an image is correctly read, and of easily correcting an image which is not correctly read is provided. The image processing system includes: an image processing apparatus A which has a reading section 105, an image processing section 110 for performing image processing of a read image, and a metadata generating section 106 for generating metadata for an abnormal image; a storage server B which stores the image and the metadata outputted from the image processing apparatus A; and an image checking apparatus C which checks whether or not the metadata is included in the image acquired from the storage server B, and which when the metadata is included in the acquired image, displays the image on the basis of the metadata, and corrects the acquired image. The image processing system is capable of correcting only the abnormal image, without re-reading all the images.

14 Claims, 13 Drawing Sheets

IMAGE PROCESSING SYSTEM

BACKGROUND OF THE INVENTION

1. Field of the Invention

The present invention relates to an image processing system which, when reading an image, displays the read image.

2. Description of the Related Art

In order to convert a book into electronic data, it is necessary to first read the pages of the book one by one by an image reading apparatus, and to store the read image in a storage server.

Meanwhile, when a book is read, the book may be inclined or read in a thinned out manner. Further, when in the book itself, a page is stained or a character and a figure are thinned out, the character and the figure may be read in a blurred manner by the image reading apparatus. That is, depending on the state of the book and the state of reading, there is a case where the book cannot be read correctly.

In such a case, there is a thought to automatically correct the page which is not correctly read. However, depending upon the degree of correction, the corrected part may become, on the contrary, hard to be read when being browsed. For example, in Japanese Patent Laid-Open No. 2003-270895, Japanese Patent Laid-Open No. 2006-245995, and Japanese Patent Laid-Open No. 2006-94099, there is disclosed an image forming apparatus which is capable of detecting an inclination, stain, and the like, of an image, and automatically performing correction processing of the detected inclination, stain, and the like.

Meanwhile, in recent years, the image quality and performance of a digital color copying machine have been improved, so as to be able to meet the user's requirements for the hue and edit processing of an output image. In such a situation, a copying machine having a preview function is commercially available, in which function, in order to obtain a desired output image, an image is displayed and checked instead of being repeatedly outputted on recording papers.

For example, in Japanese Patent Laid-Open No. 09-93378, there is disclosed an image processing apparatus in which when a user depresses a preview key and an image read key, a preview processing section displays an output image in a display section, so as to enable the user to check the output state of the image before the image is outputted.

Meanwhile, in the Japanese Patent Laid-Open No. 2003-270895, the Japanese Patent Laid-Open No. 2006-245995, and the Japanese Patent Laid-Open No. 2006-94099, there is a problem that all the correction processing is automatically performed when an inclination and stain of an image is detected, and hence, for example, in the case of an old book, on the contrary, the image becomes hard to be read by being subjected to the image inclination correction.

In the Japanese Patent Laid-Open No. 09-93378, when a plurality of images are all read and thereafter the images are previewed, and when there is a different image, for example, such as an image read in a inclined state, the presence of the erroneously scanned image can be checked. However, in order for the image to be read correctly, the plurality of images need to be read again. This significantly reduces the processing efficiency.

Therefore, in view of the above described problems, an object of the present invention is to provide an image processing system capable of checking whether or not an image can be correctly read, and of easily correcting the image which cannot be correctly read.

SUMMARY OF THE INVENTION

In order to achieve the above described object, according to the present invention, the image processing system is characterized by including: a reading apparatus having a reading section for reading an image, a detecting section for detecting an abnormal image different from a normal image, and a generating section for generating metadata for the abnormal image at the time when the abnormal image is detected; a storage apparatus for storing the image and the metadata outputted from the reading apparatus; and a processing apparatus having a checking section for displaying the abnormal image on the basis of the metadata in order to check whether or not the image outputted from the storage apparatus needs to be corrected.

The reading section reads images. The detecting section checks whether or not an abnormal image is included in the read images. The detecting section determines the read image as an abnormal image in the case where the image is inclined, where the direction of the image is different from the direction of the preceding image, or where the size of the image is different from the size detected at the time of reading.

When the detecting section detects the abnormal image, the generating section generates the metadata for the detected abnormal image.

When the reading of the images is completed, the reading apparatus outputs the read image and the generated metadata to the storage apparatus. The storage apparatus stores the image and the metadata which are inputted. At this time, the storage apparatus stores the plurality of read images as one file. Further, the storage apparatus stores the metadata in association with the stored images.

The checking section determines whether or not the metadata is included in the image outputted from the storage apparatus. When the metadata is not included in the inputted image, the checking section displays the inputted image in the state as it is. When the metadata is included in the inputted image, the checking section displays the image on the basis of the metadata.

It is characterized that, when displaying an abnormal image, the checking section displays the image by changing a part of the image. This enables a user to check whether or not the read image is read correctly. That is, when the image is not read correctly, the image is displayed in a conspicuous manner. This enables the user to immediately recognize that the image is not read correctly.

It is characterized that the processing apparatus includes a correcting section for correcting the abnormal image on the basis of the metadata. Thereby, the displayed abnormal image can be corrected. As for the correction of the abnormal image, there are a case where the inclination or the hue of the displayed abnormal image is changed, and a case where the image determined as abnormal is again read.

It is characterized that there is provided an operating section for determining processing after the abnormal image is checked. The user selects one of a re-reading operation or a correcting operation from the operating section. This enables the user to select a suitable operation in order to make the image correctly read.

For example, in the case where the user selects the correcting operation at the time when the abnormal image is an inclined image, the correcting section changes the inclination of the abnormal image. When changing the inclination of the abnormal image, the correcting section detects an inclination angle from the inclination of the abnormal image, and automatically corrects the abnormal image on the basis of the inclination angle. Alternatively, the user manually changes the inclination of the abnormal image on the basis of an input from the operating section. Thereby, it is not necessary to read again the image determined as abnormal.

In the case where the user selects the correcting operation at the time when the abnormal image is an image having a different hue, the correcting section changes the hue of the abnormal image. When changing the hue of the abnormal image, the correcting section detects a hue change in the abnormal image on the basis of the relative hue, and corrects the abnormal image automatically on the basis of the hue change. Alternatively, the user manually changes the hue of the abnormal image on the basis of an input from the operating section. Thereby, it is not necessary to read again the image determined as abnormal.

When the user selects the re-reading operation, the reading section re-reads the same image determined as the abnormal image. When the reading section re-reads the same image, the storage apparatus erases the previous image data and stores the subsequent image. Then, when the subsequent image stored in the storage apparatus is outputted, the checking section displays the subsequent image. When replacing the image, the checking section checks whether or not the meta data is included in the re-read image. When the metadata is not included, the checking section replaces the image. When the metadata is included, the reading section re-reads the image.

It is characterized that there is provided an image magnifying section which, when the image is not read correctly, magnifies the displayed image in order for the user to easily recognize the abnormality in the image. This enables the user to easily check whether or not the image is read correctly. Further, it is also possible to check whether or not there is a different state, such as a blur and abnormal reading of the image, other than the different states relating to the inclination and the hue.

It should be noted that in addition to the magnification of the displayed image, there may also be provided an image reducing section for reducing the displayed image in order to make the different state easily recognized. Alternatively, there may also be provided an image moving section for moving the displayed image. Thereby, when the entire image cannot be displayed, the entire image can be displayed by being reduced. When a part of the image is not fitted in the display, it is possible to make the image fit in the display by moving the image.

Even when there are images of different sizes, the images may be read correctly depending upon the combination of the images, without any inclination. Thus, it is characterized that the correcting section is capable of regulating the correction of the abnormal image. Thereby, when detecting an image of a specific size, particularly, an image having a size smaller than that of the other images, the correcting section regulates the correction of the image which is highly liable to be correctly read.

It is characterized that when the reading section re-reads the same image, the storage apparatus erases the previous image data and displays the subsequent image. At this time, the reading section again reads only the image determined as abnormal instead of again reading the plurality of images. Then, the checking section replaces the previous abnormal image with the subsequent normal image, so as to display the subsequent normal image. Thus, since all images are not read again, the processing efficiency is improved.

It is characterized that the storage apparatus is integrated with either the reading apparatus or the processing apparatus. This enables, when an image of a large capacity is stored, the time to input the image can be reduced. Further, the storage apparatus can be eliminated, so as to reduce the cost. It should be noted that the reading apparatus may be integrated with the processing apparatus. Thereby, the user is able to check the read image and to perform the correction processing of the image, without moving all the way to the processing apparatus.

DETAILED DESCRIPTION OF THE PREFERRED EMBODIMENTS

Figure 1:
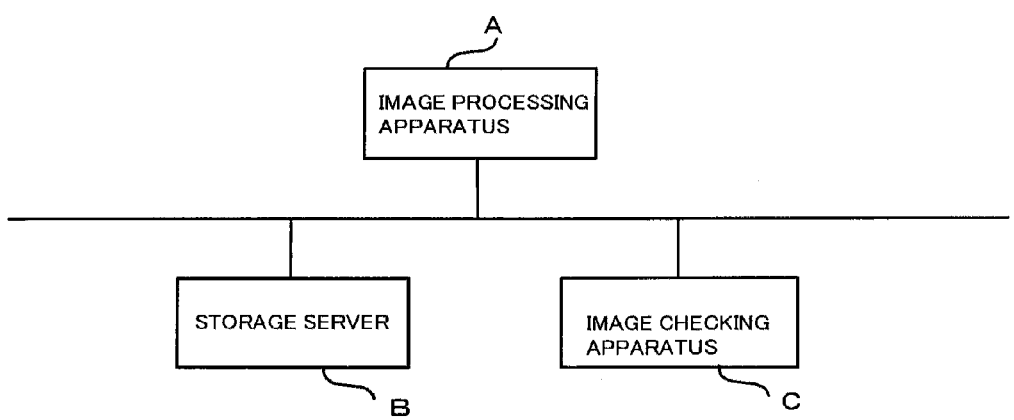
FIG. 1 is a block diagram of an image processing system according to the present embodiment.

As shown in FIG. 1, an image processing system according to the present embodiment is configured by an image processing apparatus A including a reading apparatus which reads an image, a document storage server B which is a storage apparatus for storing an image and metadata outputted from the image processing apparatus A, and an image checking apparatus C which is a processing apparatus for correcting an image outputted from the document storage server B.

The image processing apparatus A, the document storage server B, and the image checking apparatus C are respectively connected to a network, such as a LAN, a WAN, and the Internet. Thereby, the transmission and reception of data are performed between the respective apparatuses via the network.

Figure 2:
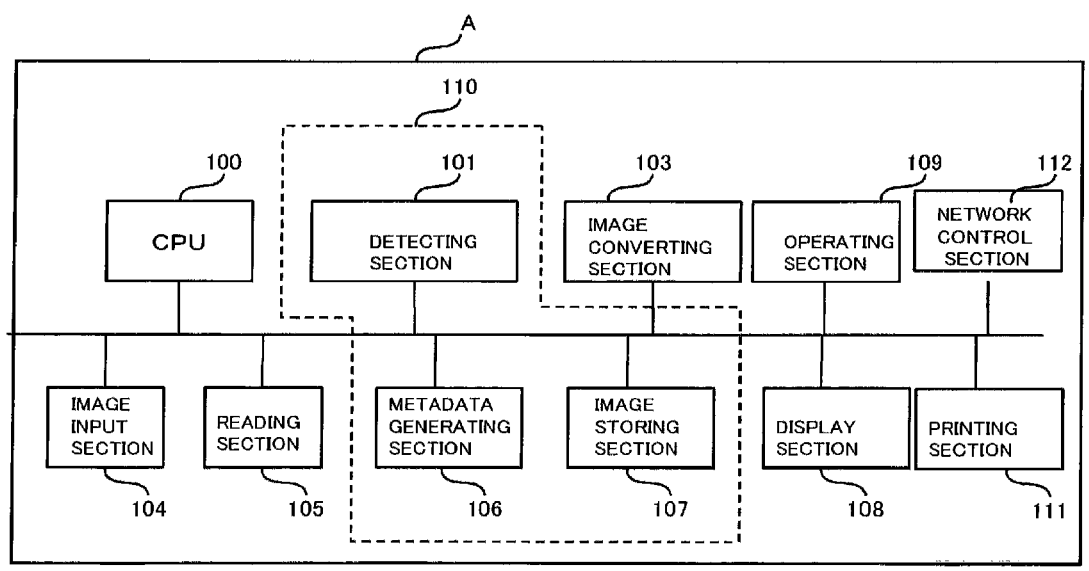
FIG. 2 is a block diagram of the image processing apparatus.

The image processing apparatus A is a digital composite machine which performs processing of a copy mode, a print mode, a scanner mode, a document filing mode, a facsimile mode, and the like. As shown in FIG. 2, the image processing apparatus A includes an image input section 104 in which a plurality of documents are set, a reading section 105 which reads images of the set documents one by one, an image storage section 107 which stores the read image, a display section 108 which displays the read image, an image processing section 110 which performs image processing of the read image, an image converting section 103 which converts the read image, a printing section 111 which prints the converted image, an operating section 109 which receives a user's input, and a CPU 100 which performs control of the apparatus as a whole.

It should be noted that the image reading apparatus B, which performs the reading of a document image and the storing of the read image, is configured by the image input section 104, the reading section 105, the image storage section 107, and the CPU 100. That is, the storage section 107 of the image processing apparatus A also serves as the storage section of the reading apparatus. Further, the CPU 100 of the image processing apparatus A also serves as the control section of the reading apparatus.

The image processing apparatus A includes a network control section 112 which communicates with an external apparatus such as the other image processing apparatus and a terminal apparatus such as a personal computer. The network control section 112 is connected to the external apparatus via a network or a telephone line, so as to be capable of performing data communication and facsimile communication.

The reading section 105 is a scanner. The reading section 105 reads an image of a document set to the image input section 104, and inputs the read image as data. Alternatively, image data are inputted by the data transmission from the external apparatus. The inputted image data are outputted to the image processing section 110. The outputted image is displayed in the display section 108 on the basis of an instruction from the CPU 100.

The image storage section 107 is configured by a hard disk apparatus. The image storage section 107 stores the image data inputted from the reading section 105, or the image data inputted from the network control section 112. It should be noted that the inputted image data are once stored in an image memory, such as a DRAM. Then, after being subjected to image processing and encryption processing, the image data are transferred from the image memory to the image storage section 107. Further, when the image data are read from the image storage section 107, the image data are subjected to image processing and decryption processing, and stored in the image memory. Thereafter, the image data are externally outputted by printing, data transmission, and facsimile communication according to the processing to be performed.

The operating section 109 includes various operation keys. The operating section 109 performs the operation instruction of the image processing apparatus as a whole, and performs the input of various settings.

The display section 108 is configured by a liquid crystal display, and displays input contents and operation states of the image processing apparatus as a whole. The display section 108 is a touch panel. Touch keys are formed in the operation screen displayed in the display section 108, and the touch keys also function as the operating section 109.

The CPU 100 performs the processing instructed to the image data. That is, according to the input from the operating section 109, or the data input from the external apparatus, the CPU 100 controls the respective sections on the basis of the program stored in the storage section 107, so as to process the image data. The CPU 100 performs, to the image data, one of the copy mode, the print mode, the scanner mode, and the facsimile mode, so as to make the image outputted in a desired form.

The image processing section 110 performs image processing, such as the editing and working of the image data. Further, the image data are also outputted by being transmitted to the external apparatus. The image processing section 110 includes a detecting section 101 which detects whether or not the read image is correctly read, and a metadata generating section 106 which when it is determined that the read image is not correctly read, that is, when it is determined that the read image is an abnormal image, generates metadata for the abnormal image. Thereby, the image processing section 110, in which the abnormal image is detected by the detecting section 101, and the metadata for the abnormal image is generated by the metadata generating section 106, outputs to the CPU 100 the read image as one file together with the metadata. It should be noted that the abnormal image is, for example, an image having a size different from that of the other images, an image directed in a different direction, such as in the longitudinal direction or the lateral direction, an inclined image, or the like.

The detecting section 101 detects a size and a direction of an image from the image data stored in the image storage section 107. Then, when the detecting section 101 detects that the size or the direction of the image is changed, by comparing the image with a previously read image or by referring to a set size and direction, the detecting section 101 determines that the image is an abnormal image. The detecting section 101 outputs the determination result to the CPU 100.

For example, in the case where a plurality of images having different sizes, such as B4 and A4, are read, when the detecting section 101 detects the A4 image subsequently to the B4 image, the detecting section 101 outputs, to the CPU 100, that the image in the different state is read. In the case where a plurality of images set in different directions, such as in the longitudinal direction and the lateral direction, are read, when the detecting section 101 detects the image set in the lateral direction subsequently to the image set in the longitudinal direction, the detecting section 101 outputs, to the CPU 100, that an abnormal image is read.

When reading an image having a different hue, such as an image having thinned or blurred characters, the detecting section 101 extracts a relative hue of the image at the time of reading the images. Here, the detecting section 101 compares the hue of the image with the hue of the previously read image. When there is a difference in the hue, the detecting section 101 detects that the image is an abnormal image having a different hue. When detecting the abnormal image having the different hue, the detecting section 101 outputs, to the CPU 100, that the abnormal image is read.

When the detecting section 101 detects the abnormal image, the metadata generating section 106 generates, on the basis of the detection result, metadata in which there are stored states of the image, such as the states in which the image is stained or inclined and in which the image has a thinned character or a blurred drawing, and the page of the abnormal image among the read images, the size of the read image, and the like. Then, the metadata generating section 106 outputs the generated metadata to the CPU 100. It should be noted that when the detecting section 101 detects no abnormal image, the metadata generating section 106 generates no metadata.

The CPU 100 outputs the image data stored in the image storage section 107 to the storage server B in combination with the metadata.

Figure 3:
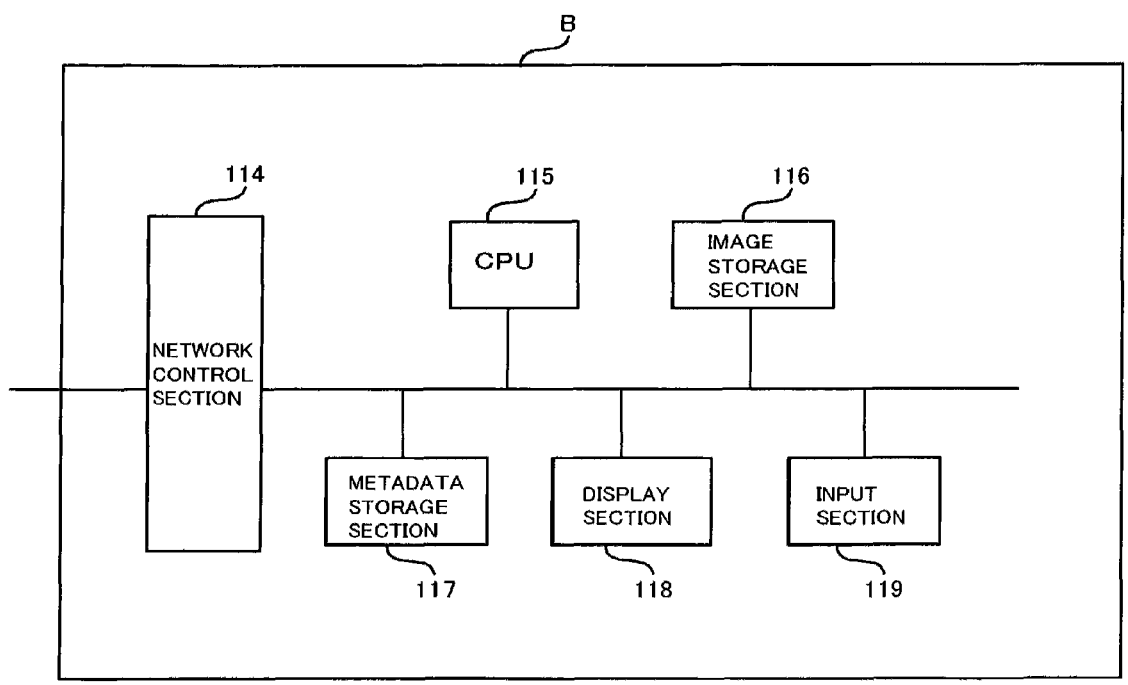
FIG. 3 is a block diagram of a storage server.

The document storage server B is a storage apparatus which stores the image data and various information. As shown in FIG. 3, the document storage server B includes a network control section 114 which receives the image data and the metadata which are inputted from the image processing apparatus A, an image storage section 116 which stores the inputted image data, a metadata storage section 117 which stores the inputted metadata, a display section 118 which displays the inputted image data, an input section 119, such as a keyboard and a mouse, and a CPU 115 which performs control of the document storage server as a whole.

The network control section 114 is a communication section which communicates with an external apparatus such as the image processing apparatus A, the image checking apparatus C, or a terminal apparatus such as a personal computer, and is connected to the external apparatus via a network or a telephone line.

The input section 119 includes various operation keys. The input section 119 performs the operation instruction of the storage server as a whole, and the input of various settings. The display section 118 is configured by a liquid crystal display, and displays the input contents and the operating states of the storage server as a whole.

The image storage section 116 and the metadata storage section 117 are configured by a hard disk apparatus. The image storage section 116 stores the image data inputted from the image processing apparatus A. The metadata storage section 117 stores the metadata inputted from the image processing apparatus A.

The CPU 115 performs processing to the inputted image data. Specifically, the CPU 115 checks whether or not the metadata is included in the image data inputted from the image processing apparatus A. When the metadata is not included in the inputted image data, the CPU 115 stores the image data in the image storage section 116. When the metadata is included in the inputted image data, the CPU 115 stores the image data in the image storage section 116, and stores the metadata in the metadata storage section 117. At this time, the CPU 115 associates the image data with the metadata, and stores the image data and the metadata in the respective storage sections. Specifically, the CPU 115 creates a list of the image data and the metadata, and respectively stores the image data and the metadata in the image storage section 116 and the metadata storage section 117 by adding the list to the image data and the metadata at the time of storing.

Figure 4:
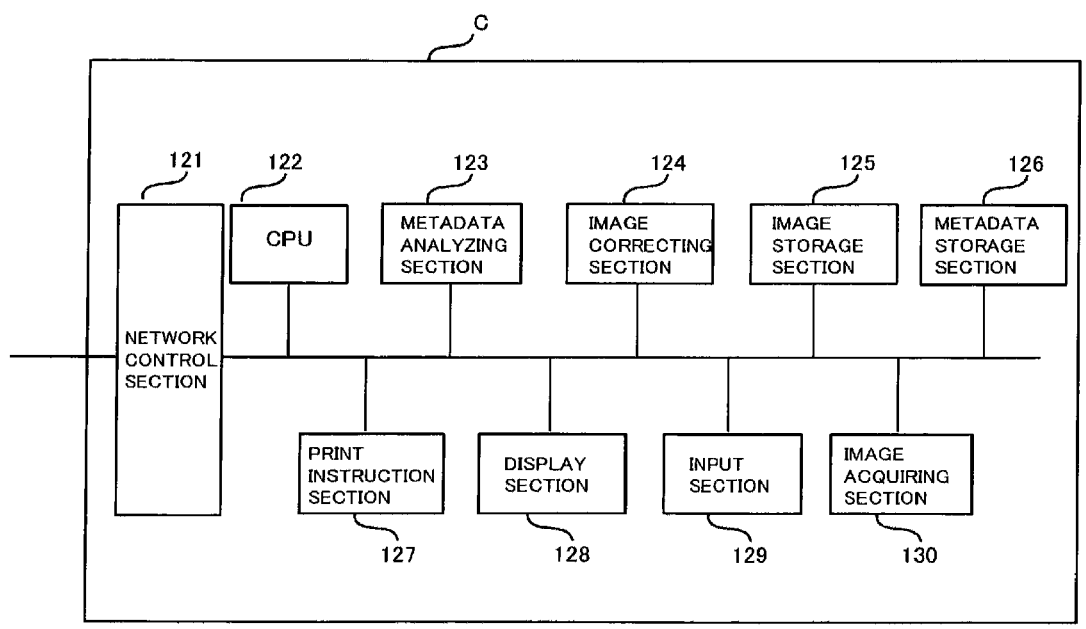
FIG. 4 is a block diagram of an image checking apparatus.

The image checking apparatus C is a terminal apparatus, such as a personal computer used by the user, and as shown in FIG. 4, includes a network control section 121 which receives the image data and the metadata which are acquired from the document storage server B, an image acquiring section 130 which acquires the image data and the metadata from the document storage server B, a metadata storage section 126 which stores the acquired metadata, a metadata analyzing section 123 which analyzes the acquired metadata, an image correcting section 124 which corrects an abnormal image on the basis of the acquired metadata, an image storage section 125 which stores the image data before and after the correction, a display section 128 which displays the image before and after the correction, a print instruction section 127 which instructs the image processing apparatus A to print the image data after the correction, an input section 129, such as a keyboard and a mouse, and a CPU 122 which performs control of the apparatus as a whole.

The network control section 121 is a communication section which communicates with an external apparatus, such as the image processing apparatus A, the image checking apparatus C, or a terminal apparatus such as a personal computer.

The input section 129, which is an operating section including various operation keys, instructs the operation of the storage server as a whole, and performs input of various settings. The display section 128 is configured by a liquid crystal display, and displays the input contents and operating states of the storage server as a whole.

When it is instructed that the operation input by the user or the present reading operation from the image processing apparatus A is completed, the image acquiring section 130 acquires image data stored in the storage server B via the network control section 121.

The image acquiring section 130 has a function as a checking section which checks whether or not the metadata is included in the acquired image data. When acquiring the image data, the image acquiring section 130 checks whether or not the metadata is included in the acquired image data, that is, whether or not there is the metadata related to the acquired image data. When the metadata is included in the image data, the image acquiring section 130 acquires the metadata which is related to the image data acquired from the metadata storage section 117 of the storage server B. Then, the image acquiring section 130 stores the image data and the metadata which are acquired, in the image storage section 125 and the metadata storage section 126, respectively. When no metadata is included in the image data, the image acquiring section 130 stores the image data acquired from the metadata storage section 117 of the storage server B, in the image storage section 125.

The metadata analyzing section 123 analyzes, on the basis of the acquired metadata, the information which is recorded in the metadata, and which relates to the state of the image, such as, for example, a states in which the image is stained or inclined, and a state in which the image has a thinned character or a blurred drawing. Then, the metadata analyzing section 123 determines whether or not the image needs to be corrected, on the basis of the acquired information.

For example, in the case where a plurality of images have different sizes such as B4 size and A4 size, the metadata analyzing section 123 determines that the correction is not needed, when determining from the metadata that the images are different only in the size. Then, the metadata analyzing section 123 outputs, to the CPU 100, that the correction is not needed. When a plurality of images are set in different directions, such as in the longitudinal direction and the lateral direction, the metadata analyzing section 123 determines that the correction is not needed, when determining from the metadata that the images are only changed from the longitudinal direction to the lateral direction or from the lateral direction to the longitudinal direction. Then, the metadata analyzing section 123 outputs, to the CPU 100, that the correction is not needed.

Figure 5:
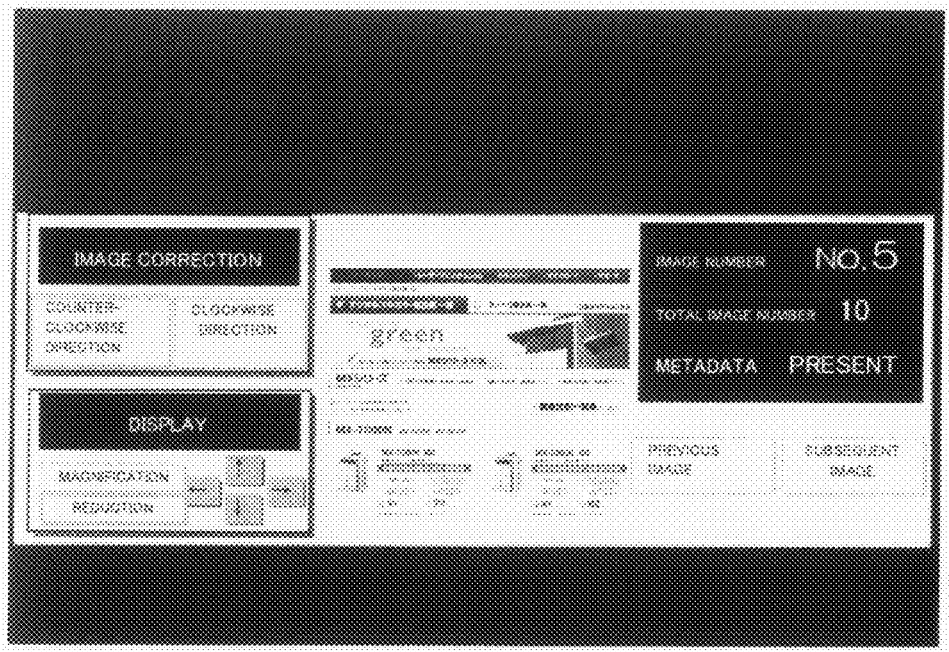
FIG. 5 is a figure showing a preview screen.
Figure 6:
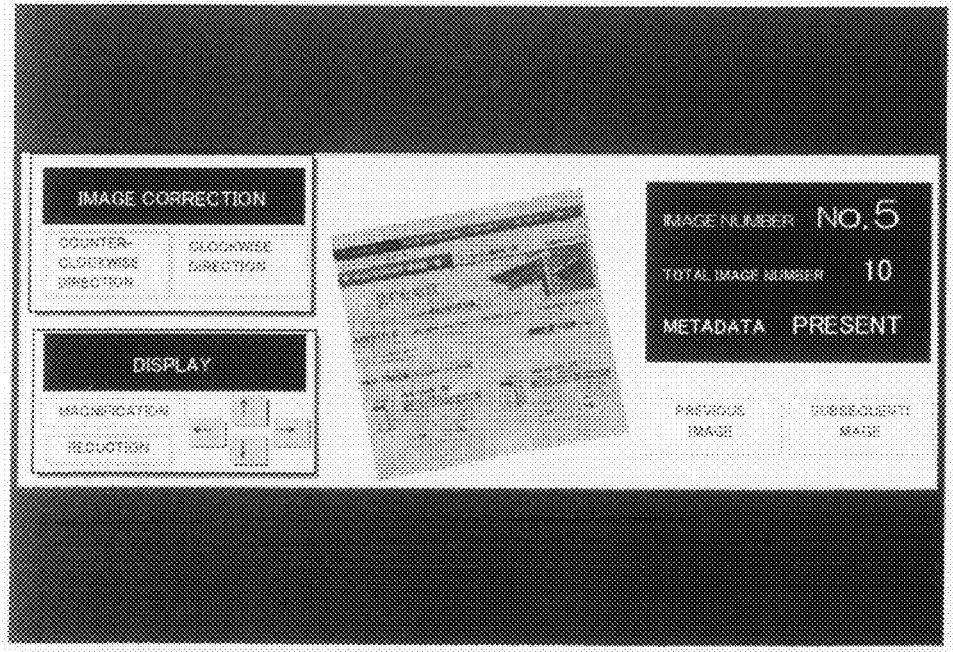
FIG. 6 is a figure showing an image in a different state.
Figure 7:
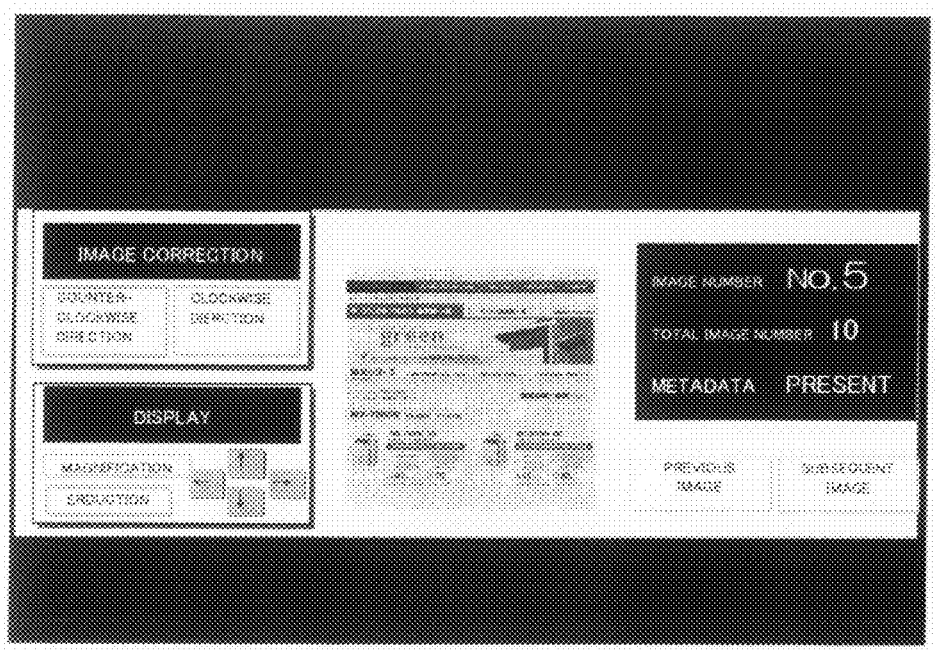
FIG. 7 is a figure showing a case where the correction of the different image is completed.

As shown in FIG. 5, the image correcting section 124 has a preview function to display the acquired image data in the display section 128. As shown in FIG. 6 and FIG. 7, the image correcting section 124 corrects the image, when it is determined by the metadata analyzing section 123 that the image needs to be corrected. That is, the image correcting section 124 is a correcting section for correcting the abnormal image which is determined as requiring the correction by the metadata analyzing section 123 on the basis of the metadata. The image correcting section 124 corrects the abnormal image on the basis of the result analyzed by the metadata analyzing section 123.

Specifically, as shown in FIG. 5, the image correcting section 124 displays in the display section 128 operation buttons, such as a previous image button, a subsequent image button, an image correction button, and a display button, which function as the input section 129. The user instructs whether or not the image displayed in the display section 128 is corrected. For example, when the correction relating to the inclination or the hue of the displayed abnormal image is not needed, the user determines that the correction is not performed, and instructs the image correcting section 124 not to perform the correction, by depressing the subsequent image button. When the correction is needed, the user instructs the image correcting section 124 to perform the correction, by depressing the image correction button. The image correcting section 124 checks the instruction inputted from the input section 129. It should be noted that the instruction of whether or not the correction is performed, may also be automatically determined by the image correcting section 124. In this case, whether the determination is performed by the image correcting section 124 or by the user, is initially set, or set by the user at each time.

When correcting the inclination of the image, the image correcting section 124 extracts the edge of the abnormal image on the basis of the metadata, and determines the need of correction on the basis of whether or not the edge is inclined with respect to the vertical direction. The image is corrected on the basis of the determined inclination angle. At this time, there are two methods, in one of which the correction is automatically performed by calculating a rotational angle from the detected inclination angle, and in the other of which the input section 119 for rotating the image is provided in the display section 118, and the inclination of the image is manually changed on the basis of the input from the user. It should be noted that which one of the correcting methods is performed, is made selectable.

When correcting the hue of the image, the image correcting section 124 extracts, from the metadata, the hue change representing the hue density. The image correcting section 124 corrects the hue of the image on the basis of the extracted hue change. For example, at a place where a character is determined to be thin, the image correcting section 124 increase the density of the character. At a place where a character is determined to be blurred, the image correcting section 124 fills the blanks in the blurred character. Thereby, a uniform image without the unevenness is obtained. At this time, there are two methods, in one of which the hue is automatically corrected by calculating the density of hue from the detected hue change, and in the other of which the input section 119 for changing the density of the image is provided in the display section 118, and the hue of the image is manually changed on the basis of the input from the user. It should be noted that which one of the methods is performed, is made selectable.

For correcting the image, not only the image is rotated and the hue is changed, but also the image of the document may be read again. For example, when the image correcting section 124 again reads the displayed image, the user sets the image to be again read to the image input section 104, and instructs the re-reading of the document image from the operating section 109 of the image processing apparatus A. The image processing apparatus A stores the read image in the storage server B. At this time, the image processing apparatus A outputs, to the image checking apparatus C, that the re-reading of the image is completed. When the instruction is inputted from the image processing apparatus A, the CPU 122 instructs the image acquiring section 130 to acquire the image stored in the storage server B. The image acquiring section 130 acquires the image on the basis of the instruction of the CPU 122. Then, the image acquiring section 130 stores the acquired image data in the image storage section 125, and outputs to the CPU 122 that the acquired image data are stored. When the CPU 122 outputs to the image correcting section 124 that the image is stored in the image storage section 125, the image correcting section 124 reads the stored image, and replaces the abnormal image with the read image.

Figure 8:
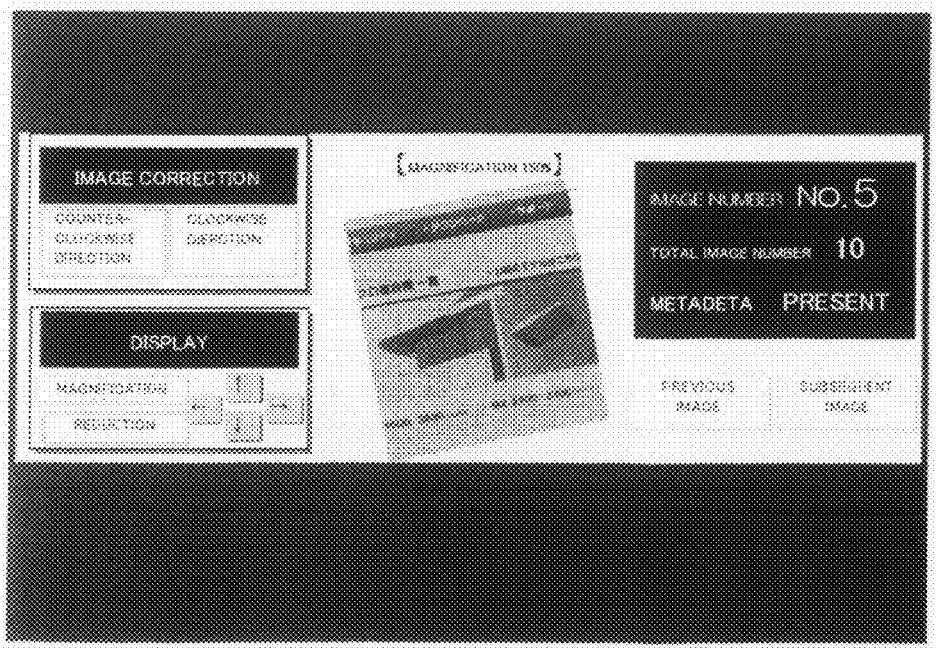
FIG. 8 is a figure showing a case where the different image is enlarged.
Figure 9:
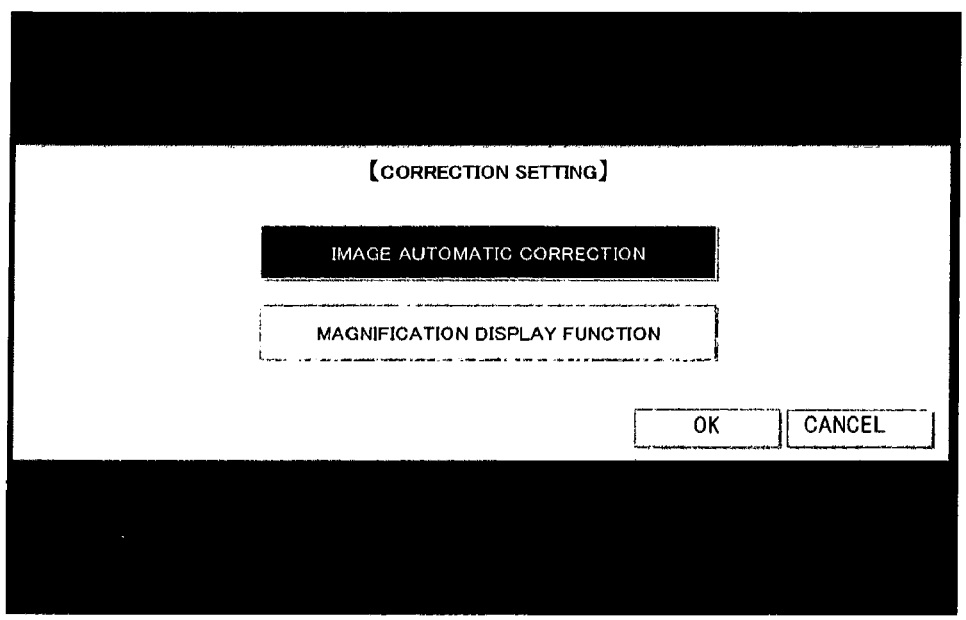
FIG. 9 is a figure showing a setting screen.
Figure 10:
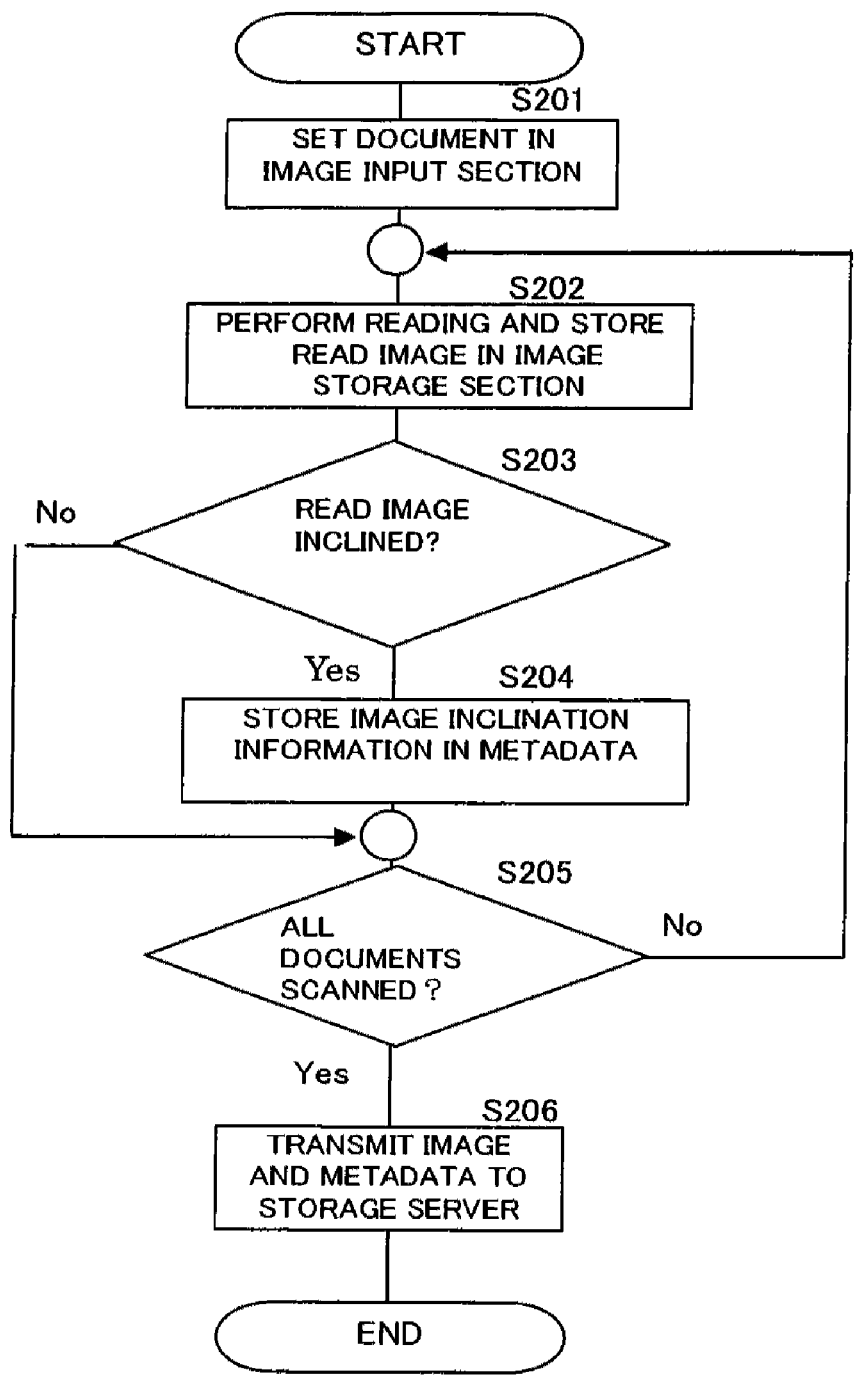
FIG. 10 is a figure showing a flow chart of an image reading function procedure.
Figure 11:
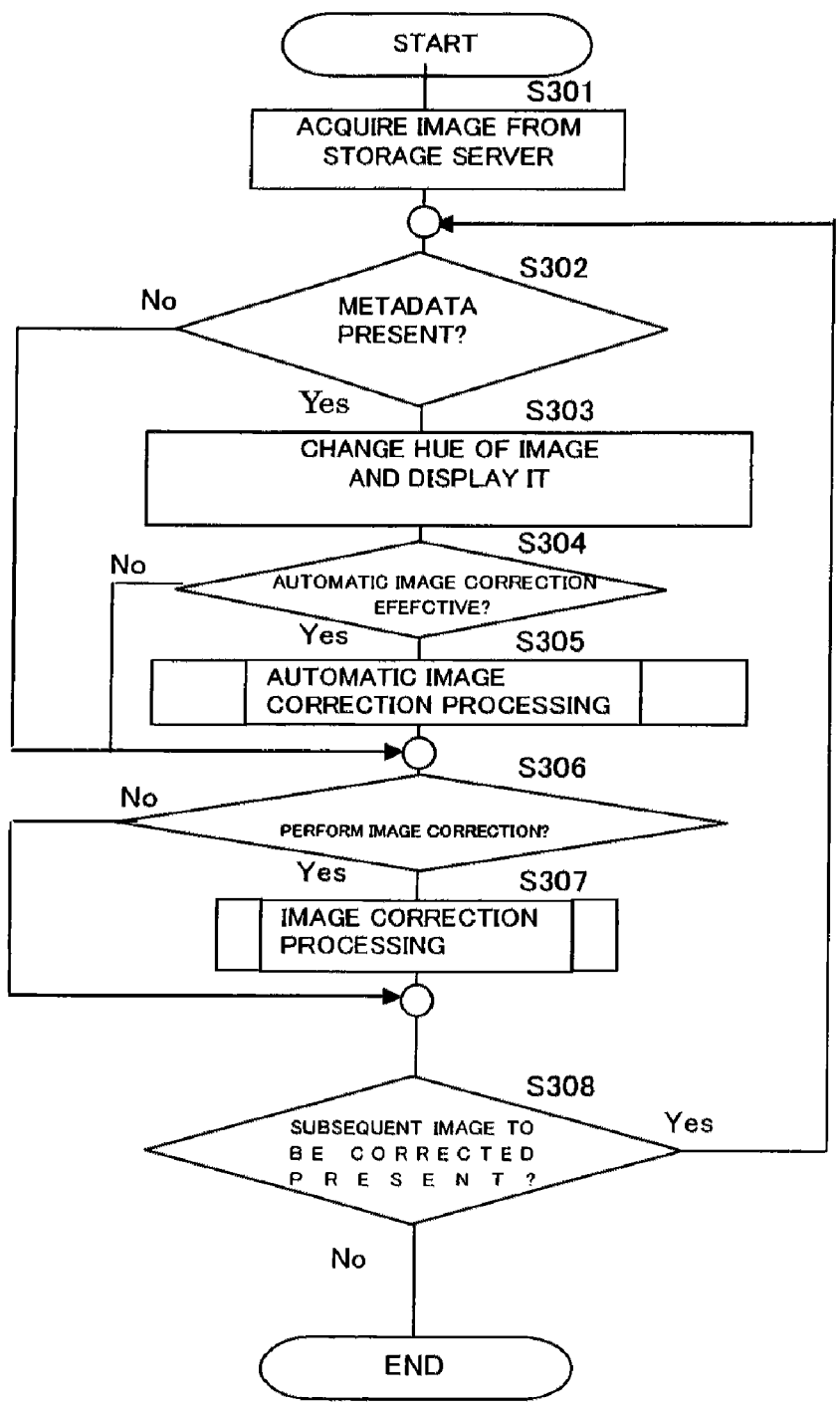
FIG. 11 is a figure showing a flow chart of an image correcting function procedure.

In order to make it easy to recognize the inclined state of the image at the time when the inclined image is corrected as shown in FIG. 6, the image correcting section 124 includes an image magnifying section for magnifying the displayed image as shown in FIG. 8. The image magnifying section magnifies the displayed image on the basis of a magnification inputted from the input section which is displayed in the display section 128 by the image correcting section 124, or on the basis of a predetermined magnification. Specifically, the image is magnified by depressing a magnification button displayed in the display section 128.

The image correcting section 124 includes an image reducing section for reducing the magnified image and an image moving section for moving the image in the display section 128. These operations are performed by the input section displayed in the display section 128. Specifically, when an image is reduced, the image is reduced by depressing of a reduction button shown in FIG. 8. When an image is moved, a cross button shown in FIG. 8 is depressed, and thereby the image is moved in the direction indicated by the arrow of the cross button.

It should be noted that the magnification and reduction of an image can be changed with the same ratio in both the longitudinal and lateral directions, but may also be changed with ratios which are different between the longitudinal and lateral directions. The magnification or reduction of the image may be performed only in one of the longitudinal and lateral directions, and may not be performed in the other direction. Further, the magnification button, the reduction button, and the cross button are touch keys in the operation screen displayed in the display section 128, and function as the input section 129.

When detecting an image having a different size, the image correcting section 124 inhibits the correction of the image in the case where the size of the image is a preset specific size. Specifically, the user sets the specific size for which the correction is inhibited. For example, in the case of document images in which longitudinally directed images of A5 size are mixed with the laterally directed images of A4 size, the user sets the image of A5 size as the image having the specific size. The image correcting section 124 checks from the metadata whether or not the detected image is the set image of A5 size. When the detected image is the image of A5 size, the image correcting section 124 inhibits the correction of the image. When the image is an image having a size other than the A5 size and an abnormal image, the image correcting section 124 displays the detected image.

When the image processing relating to the above described image correction is completed, the image correcting section 124 stores the corrected image data in the image storage section 125. Further, the image correcting section 124 outputs the corrected image to the storage server B, so that the storage server B stores the corrected image by replacing the image before the correction with the corrected image.

The print instruction section 127 outputs the corrected image data to the image processing apparatus A, so as to make the image processing apparatus A perform the print processing. The print instruction section 127 sets the processing condition for performing the image processing function, and outputs to the image processing apparatus A the processing condition together with the image data to be printed. The CPU 100 of the image processing apparatus A virtually forms the images by developing the image data on the memory on the basis of the inputted processing condition, and controls the image processing section 110 to change, magnify, reduce, move, and modify each of the images. The image processing section 110 outputs the modified image data to the image storage section 107, and the image storage section 107 stores the image data. The image converting section 103 reads the image data from the image storage section 107, and converts the image data into image data for printing. The converted image data are printed from the printing section 111.

Next, the procedure of the image reading function according to present embodiment will be described with reference to FIG. 9 to FIG. 14. Here, there is described, as an example, a case where a plurality of images having different sizes are read, and the read images are printed on recording sheets.

Further, an abnormal image is assumed to be an inclined image, for convenience of explanation.

A plurality of images having different sizes are set to the image input section 104 of the image processing apparatus A (S201). When an operation input for making the image reading function performed, is performed by the user via the operating section 109, the CPU 100 starts the image reading function.

The image processing apparatus A waits for the operation input from the user so as to start reading the image. The image processing section 110 receives the document image from the reading section 105. The image processing section 110 stores the read image in the image storage section 107 (S202).

The detecting section 101 detects whether or not the image is inclined, each time the image is read (S203). When the image is not inclined, the image is continued to be read as it is, until the reading is completed (S205).

When the detecting section 101 detects that the image is inclined (S203), the detecting section 101 outputs the detection result to the metadata generating section 106. Then, the metadata generating section 106 generates metadata on the basis of the detection result (S204).

The image processing section 110 checks whether or not the reading is completed (S205). When the reading is not completed, the image processing section 110 continues the reading.

When the reading is completed, the image processing section 110 outputs the read image data and the generated metadata to the storage server B (S206).

The image checking apparatus C waits for the operation input from the user so as to start acquiring the image data stored in the storage server B. The image acquiring section 130 acquires one image data from the plurality of image data stored in the storage server B, and stores the acquired image data in the image storage section 125 (S301). At this time, the image acquiring section 130 checks whether or not the metadata is included in the acquired image data (S302). When the metadata is not included, the image acquiring section 130 performs the operations in S306 to S308 as will be described below.

When the metadata is included, the image acquiring section 130 stores the metadata in the metadata storage section 126. At this time, the image acquiring section 130 transmits to the CPU 122 the information that the metadata is included. The CPU 122 instructs the metadata analyzing section 123 to analyze the metadata. The metadata analyzing section 123 acquires from the metadata, information, such as the image state, the image size, and the page of the image, and outputs the information to the image correcting section 124. Then, the metadata analyzing section 123 determines whether or not the correction needs to be performed, and outputs the determination result to the CPU 122. When the correction is not needed, the CPU 122 checks whether or not there is a subsequent image which needs to be corrected (S308). When there is an image which needs to be corrected, the CPU 122 instructs the image correcting section 124 to correct the subsequent image.

On the basis of the information from the metadata analyzing section 123, the image correcting section 124 displays the image by changing the hue of the displayed image, so as to enable the user to recognize that the image is read in the inclined state (S303).

Figure 12:
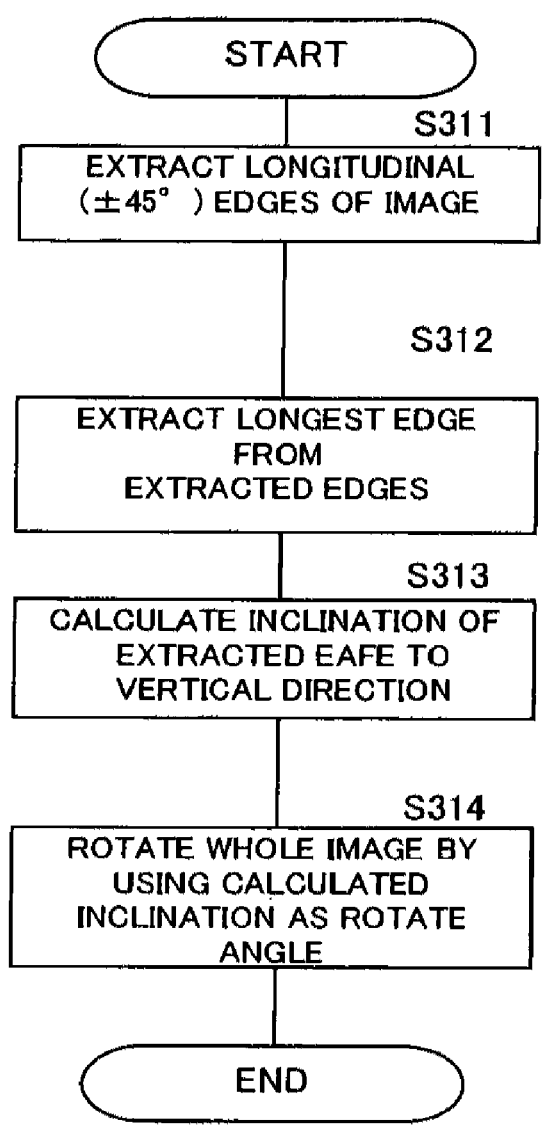
FIG. 12 is a figure showing a flow chart in the case of automatically correcting an image.

The image correcting section 124 checks whether or not the automatic correction is effective (S304). When the automatic correction is effective, the image correcting section 124 first extracts the longitudinal edges of the image as shown in FIG. 12 (S311). The image correcting section 124 extracts the longest edge from the extracted longitudinal edges (S312).

The image correcting section 124 calculates the inclination of the extracted longest edge with respect to the vertical direction (S313). The image correcting section 124 corrects the whole image by rotating the whole image using the calculated inclination as a rotation angle, and ends the automatic correction (S314). Then, as shown in FIG. 7, the image correcting section 124 displays the corrected image in the display section 128, and confirms to the user whether or not to end the correction of the image (S306).

When the correction of the image is ended, the CPU 122 checks whether or not there is a subsequent image which needs to be corrected, on the basis of the presence of the metadata (S308). When there is a subsequent image which needs to be corrected, the CPU 122 performs the operations from S302 to S308, and repeats the operations until the correcting operation of all the image data is completed.

Figure 13:
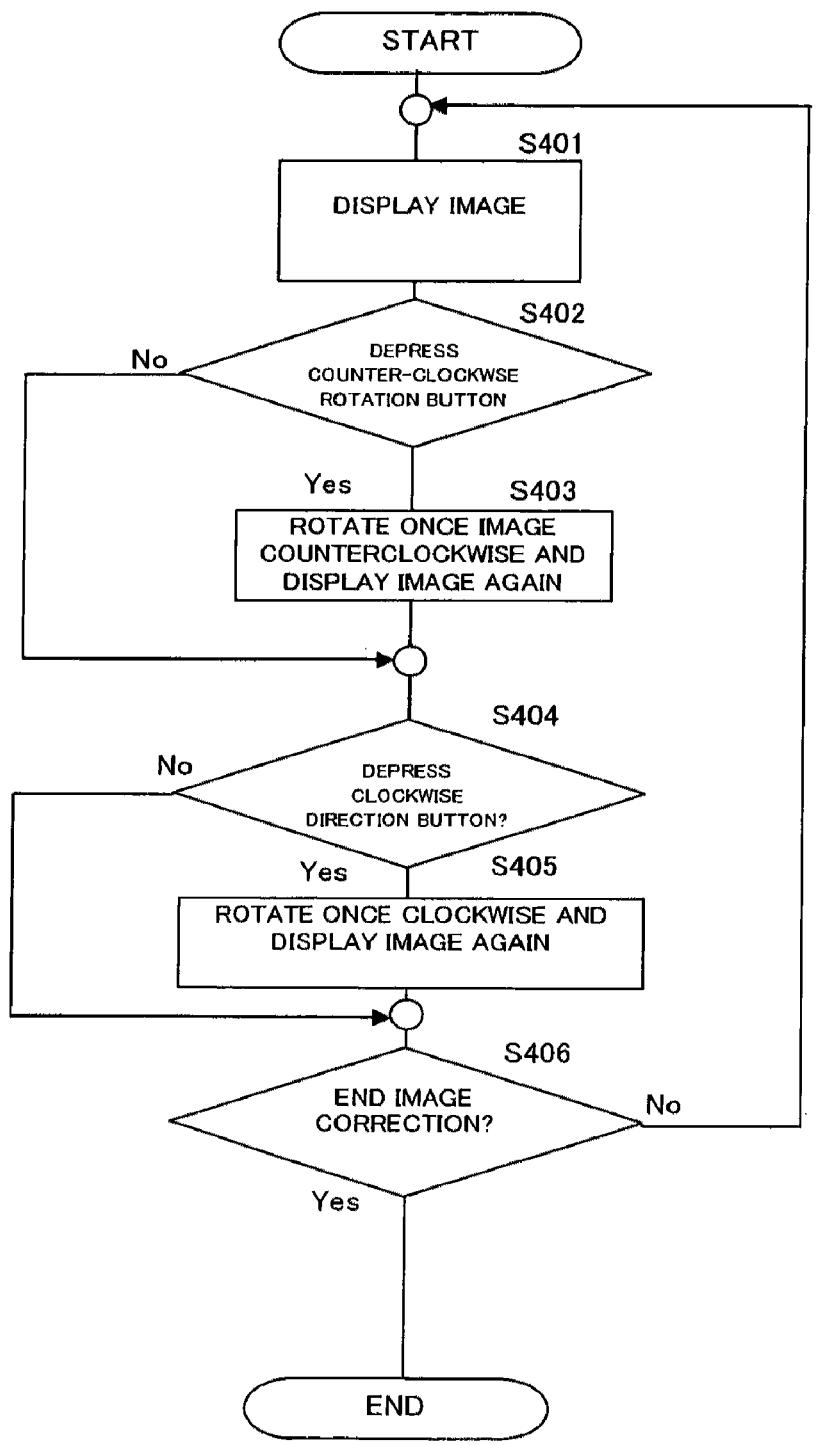
FIG. 13 is a figure showing a flow chart in the case of manually correcting an image.

When the correction is It should be notednded, that is, when the fine adjustment of correction is performed by the user, the user performs the operation input to start the image correction function. The CPU 122 starts the correction, as shown in FIG. 13 (S401). The user depresses a counter clockwise rotation button or a clockwise rotation button in compliance with the inclination of the image. The image correcting section 124 performs the rotation processing of the image on the basis of the input, and displays the processing result in the display section (S402 to S406). The CPU 122 checks whether or not the correction of the image is completed, on the basis of the presence of the operation input by the user (S406). When the correction of the image is not completed, the CPU 122 performs the operations from S402 to S406 until the correction is completed. When the instruction to end the correction is inputted by the user, the CPU 122 checks whether or not there is a subsequent image which needs to be corrected (S308). When detecting the input of the subsequent image button, the image correcting section 124 starts the correction of the subsequent image.

Figure 14:
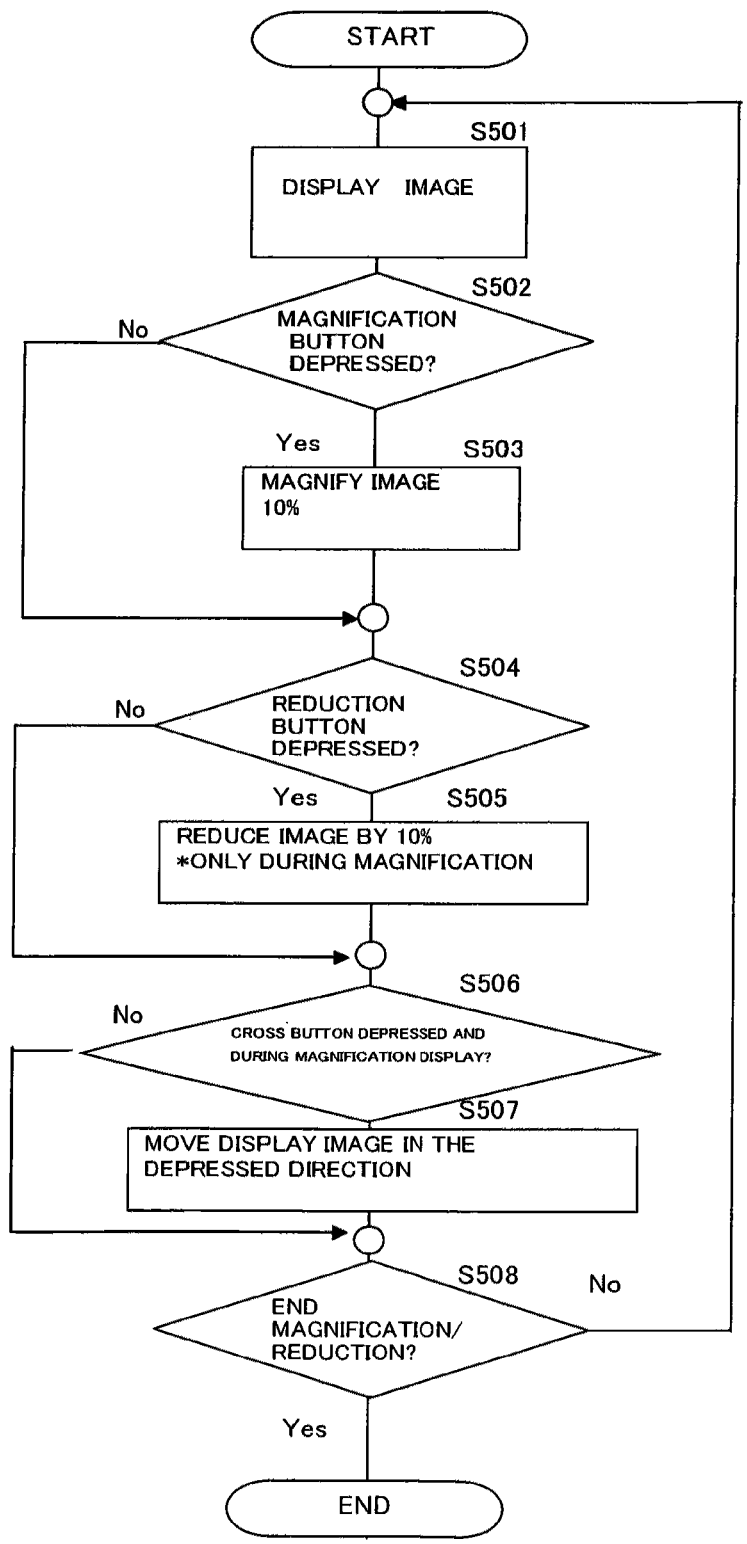
FIG. 14 is a figure showing a flow chart in the case of magnifying, reducing and moving an image.
Figure 15:
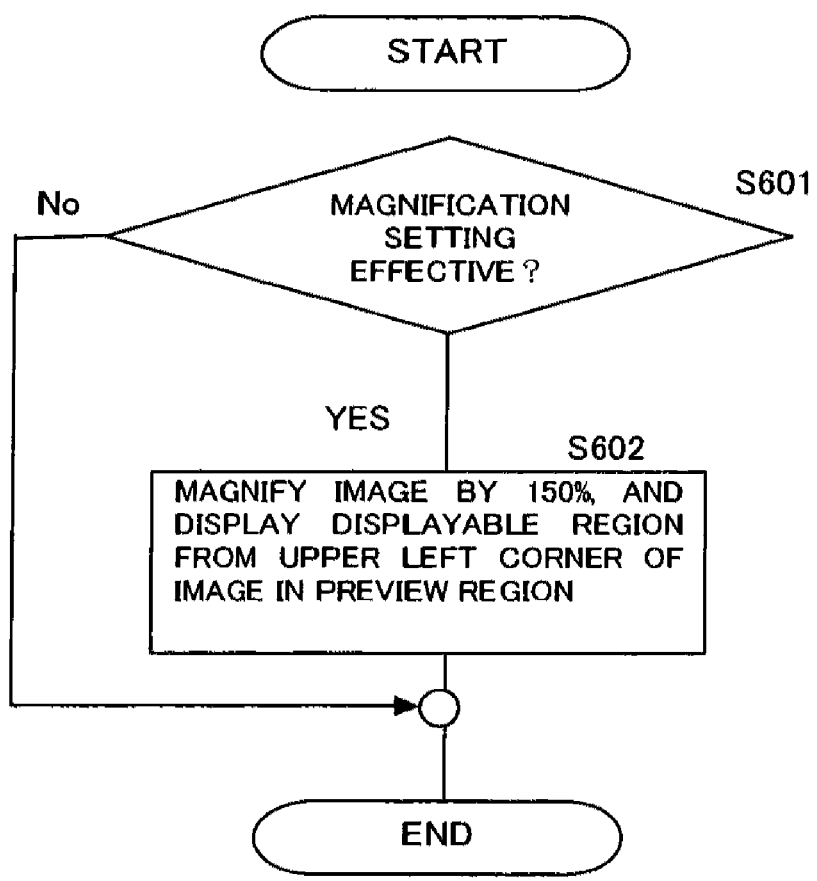
FIG. 15 is a figure showing a flow chart for displaying an image in the case where the image is magnified.

Meanwhile, when the image is manually corrected, there is a case where the inclination of the image cannot be clearly shown. In this case, the image is magnified as shown in FIG. 8. Specifically, as shown in FIG. 14, the image correcting section 124 first displays a preview screen (S501). When the magnification button is depressed (S502), the image is magnified at a set magnification (S503). Specifically, as shown in FIG. 15, the image magnifying section checks whether or not the magnification setting is effective (S601). When the magnification setting is It should be notedffective, the image magnifying section ends its operation as it is, without performing the magnifying operation. When the magnification setting is effective, the image magnifying section displays in the display section 128 the region of the image which can be displayed from the upper left corner of the image, based on the set magnification (S502). It should be noted that when the reduction button is depressed (504), the magnified image is reduced at a set reduction rate (S504).

In the case where the image is magnified or reduced, and where a part of the image which is to be checked is not fitted in the display section 128 and is not displayed, when the cross button is depressed (S506), the display position of the image is moved in the direction indicated by the arrow of the depressed cross button (S507). Then, it is checked whether or not the image is adjusted to a position where the inclination of the image is easily checked (S508). When the position needs to be adjusted, the operations from S502 to S508 are performed until the adjustment is completed. When the adjustment is completed, the correction of the inclination of the image is started.

When the image is displayed in the preview screen on the basis of the information of the metadata, there is a case where the image is an image only having a different size and is correctly read. At this time, the subsequent screen button is depressed. The image correcting section 124 recognizes the image as a correct image, and stores the image data in the image storage section 125.

When the correction is completed and there is no image to be read, the image correcting section 124 outputs the corrected image to the image storage section 125, so as to make the corrected image stored in the image storage section 125, and ends the correcting operation.

It should be noted that when there is an operation input from the user to make the corrected image printed, the CPU 122 instructs the print instruction section 127 to print the image. The print instruction section 127 outputs the corrected image data to the image processing apparatus A. When receiving from the print instruction section 127 the image data together with the print instruction, the image processing apparatus A outputs the received image data to the image converting section 103, so as to make the image data printed on printing sheets.

As described above, when the detecting section 101 detects that the read image is in a state different from the normal state, the metadata generating section 106 generates the metadata for the abnormal image, and stores the metadata in the storage server B together with the read image. Then, when an input is made by the user, the image checking section C checks whether or not, when the image acquiring section 130 acquires the image from the storage server, the metadata is included in the acquired image. When the metadata is included, the image checking section C is enabled to correct the image on the basis of the metadata. Further, even when determining the image as an abnormal image, the image checking section C corrects only the abnormal image. Thus, the normal images which are already read are left, so that the trouble to read all the image and the useless work can be avoided.

It should be noted that it is obvious that the present invention is not limited to the above described embodiment, and various modification and changes may be applied to the above described embodiment within the scope of the present invention.

In the present embodiment, when the image is inclined, the correction is performed on the basis of the display of the image, but the image may be read again. For example, when it is determined that the read image is inclined, the user checks the page number and the image which are displayed in the display section, and sets the image to be again read to the image input section. Then, when the operation input for re-reading the image is performed by the user, the reading section performs the re-reading of the image. The image processing apparatus stores the re-read image in the storage server, and at the same time, transmits to the image checking apparatus the information that the re-reading is completed. When the image checking apparatus receives the information that the re-reading is completed, the image acquiring section acquires the stored image data. Then, the image correcting section displays the acquired image by replacing the inclined image with the acquired image. When the inclination is eliminated, the image correcting section checks from the user whether or not there is a subsequent image to be corrected, and re-starts the correction processing. When the inclination is not eliminated, the re-reading is performed until the inclination is eliminated.

In the present embodiment, the correction processing is described by using an inclined image as an abnormal image, but the correction processing may also be performed even in the case of an image having a different hue. For example, in the case where it is determined from the metadata that an image has a different hue, such as a case where the image has a thin character or a blurred character, the image correcting section extracts a relative hue on the basis of the displayed image. Here, the image correcting section performs comparison with the hue of the part recognized as abnormal. When there is a difference in the hue, the image correcting section changes the hue of the part recognized as abnormal so as to effect the relative hue matching.

In the present embodiment, the image checking apparatus acquires an image from the storage server at the timing when the operating instruction is inputted from the user, but the present invention is not limited to this. For example, when the image processing apparatus stores the read image and the metadata in the storage server, the image processing apparatus outputs to the image checking apparatus that the read image and metadata are stored in the storage server. The image checking section may acquire the image from the storage server at the timing when receiving the information. This enables the image checking section to acquire the image without the user moving all the way to perform the checking and operation. Thereby, the work can be simplified.

In the present embodiment, when a different image is displayed, the hue of the image is changed to enable the user to recognize the image, but the present invention is not limited to this. The different image may be notified by sound. Further, the image may be flashed. That is, the image may be notified in any form as long as the image can be recognized by the user.

In the present embodiment, the image is further fine adjusted manually after being automatically adjusted by the correcting section, but the present invention is not limited to this. For example, the correcting section may automatically perform the fine adjustment of the image. Thereby, the image can be corrected without the trouble of the user. Alternatively, the user may manually perform the fine adjustment of the image. This enables the user to obtain an image having a desired inclination.

In the present embodiment, the image processing apparatus, the storage server, and the image checking apparatus are described as independent apparatuses separated from each other, but the present invention is not limited to this. For example, the image processing apparatus may be integrated with the image checking apparatus. In this case, the image is checked by the display section provided in the operating section of the image processing apparatus. This enables the user to check the read image and perform the correction processing of the image without the user moving all the way to the image checking apparatus.

The image processing apparatus may be integrated with the storage server. In this case, the read image and the metadata related with the read image are stored in the storage section of the image processing apparatus. Thereby, the storage server can be eliminated, and the cost can be reduced.

The image checking apparatus may be integrated with the storage server. In this case, the read image and the metadata related with the read image are stored in the storage section of the image checking apparatus. Thereby, the storage server can be eliminated, and the cost can be reduced. Further, when an image having a large capacity is received, it is possible to reduce the reception time at the time when the image is acquired.

What is claimed is:

1. An image processing system comprising:
a reading apparatus including a reading section for reading an image, a detecting section for detecting, from among read images, an abnormal image different from a normal image by comparing a read image with a preceding read image and by determining whether or not a direction or a size of said read image is different from a preset direction and/or size, a generating section for generating metadata for the abnormal image at a time when the abnormal image is detected;

a storage apparatus for storing an image and metadata which are outputted from the reading apparatus; and a processing apparatus including a checking section for displaying the abnormal image on the basis of the metadata, in order to check whether or not an image outputted from the storage apparatus needs to be corrected.

2. The image processing system according to claim 1, wherein the checking section determines, when acquired the image from the storage apparatus, whether or not the metadata is included in the image, and displays, when determined that the metadata is included in the image, the abnormal image by changing a part of the abnormal image.

3. The image processing system according to claim 1, wherein the processing apparatus includes a metadata analyzing section for determining whether or not the image needs to be corrected based on the metadata and a correcting section for correcting the abnormal image on the basis of the metadata when it is determined that the image needs to be corrected.

4. The image processing system according to claim 3, wherein when the abnormal image is an inclined image, the correcting section detects an inclination angle from the inclination of the abnormal image, and corrects the abnormal image by rotating the abnormal image on the basis of the inclination angle.

5. The image processing system according to claim 4, wherein the processing apparatus includes an operating section for rotating the displayed image, and the correcting section corrects the abnormal image according to an input from the operating section.

6. The image processing system according to claim 3, wherein when the abnormal image is an image having a different hue, the correcting section detects a relative hue change , and performs a correction on the basis of the hue change, to make the hue of the abnormal image relatively identical to the hue of the normal image.

7. The image processing system according to claim 6, wherein the processing apparatus includes an operating section for changing the hue of the displayed image, and the correcting section corrects the abnormal image according to an input from the operating section.

8. The image processing system according to claim 3, wherein when the abnormal image is an image having a different size, the correcting section regulates the correction of the abnormal image.

9. The image processing system according to claim 8, wherein the processing apparatus includes an operating section for changing the size of the displayed image, and the correcting section corrects the abnormal image according to an input from the operating section.

10. The image processing section according to claim 3, wherein the correcting section modifies the displayed image.

11. The image processing system according to claim 1, wherein the storage apparatus is integrated with either the reading apparatus or the processing apparatus.

12. The image processing system according to claim 1, wherein the reading apparatus is integrated with the processing apparatus.

13. The image processing system according to claim 1, wherein the storage apparatus stores in a file unit the image read for each page by the reading apparatus.

14. The image processing system according to claim 1, wherein when the reading section re-reads the same image, the storage apparatus erases the previous image data and stores the subsequent image.

* * * * *